United States Patent
Hochberg et al.

(10) Patent No.: US 8,456,032 B2
(45) Date of Patent: Jun. 4, 2013

(54) ROTATIONAL KINETIC ENERGY CONVERSION SYSTEM

(75) Inventors: David J. Hochberg, Oak Park, MI (US); Gregory E. Peterson, Sylvan Lake, MI (US)

(73) Assignee: Dynamic Energy Technologies, LLC, Southfield, MI (US)

( * ) Notice: Subject to any disclaimer, the term of this patent is extended or adjusted under 35 U.S.C. 154(b) by 210 days.

(21) Appl. No.: 13/154,971

(22) Filed: Jun. 7, 2011

(65) Prior Publication Data

US 2011/0298217 A1  Dec. 8, 2011

Related U.S. Application Data

(60) Provisional application No. 61/352,120, filed on Jun. 7, 2010.

(51) Int. Cl.
*F03B 13/00* (2006.01)
(52) U.S. Cl.
USPC .............................................. 290/54; 290/43
(58) Field of Classification Search
USPC ....................................................... 290/43, 54
See application file for complete search history.

(56) References Cited

U.S. PATENT DOCUMENTS

| | | | |
|---|---|---|---|
| 4,827,163 A | | 5/1989 | Bhate et al. |
| 5,440,175 A | * | 8/1995 | Mayo et al. ............... 290/54 |
| 6,291,901 B1 | | 9/2001 | Cefo |
| 6,600,399 B1 | | 7/2003 | Trandafir |
| 6,833,637 B2 | | 12/2004 | Park et al. |
| 6,914,351 B2 | | 7/2005 | Chertok |
| 7,285,868 B2 | | 10/2007 | Wilson |
| 7,586,220 B2 | | 9/2009 | Roberts |
| 7,687,943 B2 | | 3/2010 | Lunde |
| 2010/0006362 A1 | | 1/2010 | Armstrong |
| 2011/0011079 A1 | * | 1/2011 | Kamen et al. ............... 60/520 |

FOREIGN PATENT DOCUMENTS

| | | |
|---|---|---|
| CN | 101582623 A | 11/2009 |
| ES | 2016497 A6 | 11/1990 |
| JP | 02072233 | 3/1990 |
| JP | 04129815 | 4/1992 |
| JP | 2000152558 A | 5/2000 |
| JP | 200212001 | 4/2002 |
| JP | 2005033917 A | 2/2005 |
| JP | 2006149163 A | 6/2006 |
| JP | 2006296144 A | 10/2006 |
| KR | 1019970034204 | 7/1997 |
| KR | 1019990076756 | 10/1999 |
| KR | 1020090110891 | 10/2009 |

OTHER PUBLICATIONS

PCT/US2011/039448 International Search Report and Written Opinion of the International Searching Authority dated Feb. 9, 2012.

(Continued)

*Primary Examiner* — Tho D Ta
(74) *Attorney, Agent, or Firm* — Young Basile Hanlon & MacFarlane PC; Daniel J. Checkowsky

(57) ABSTRACT

An energy conversion system for converting between one form of input energy selected from a mechanical energy and electrical energy, and an output energy selected from a mechanical energy and electrical energy using a linearly displaced magnetic component interacting with an orbitally displaced magnetic component.

23 Claims, 11 Drawing Sheets

OTHER PUBLICATIONS

PCT/US2011/047342 International Search Report and Written Opinion of the International Searching Authority dated Mar. 26, 2012.

Paul Evans, "Regeneration no longer just about braking," http://www.gizmag.com/regeneration-no-longer-just-about-braking/10640/; Jan. 1, 2009.

Darren Quick, "Regenerative shock absorber to bump up car energy capture capabilities," http://www.gizmag.com/regenerative-shock-absorber/14564/; Mar. 19, 2010.

Paul Evans, "MIT Students develope Hydraulic Regenerative Shock Absorbers," http://www.gizmag.com/hydraulic-regenerative-shock-absorber-mit/10968/; Feb. 12, 2009.

Lei Zuo, et al., "Design and characterization of an electromagnetic energy harvester for vehicle suspensions," 2010 IOP Publishing Ltd.; Feb. 25, 2010.

PCT International Search Report dated Nov. 19, 2010 for PCT/US2010/032037.

* cited by examiner

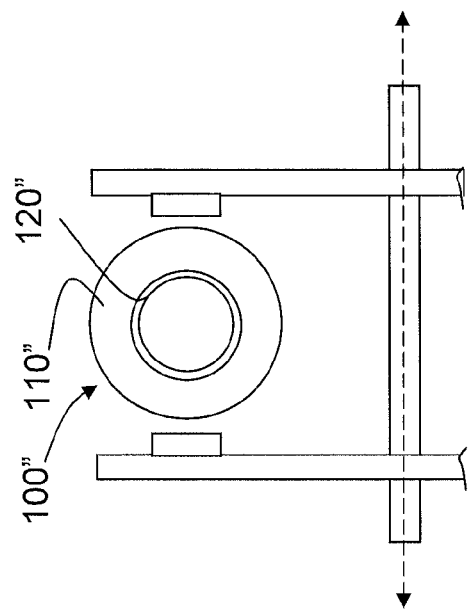
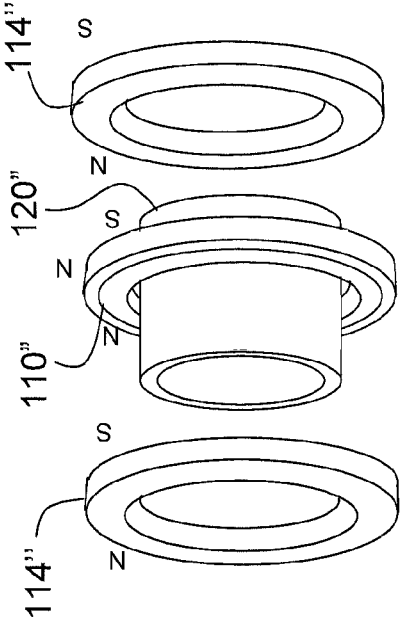
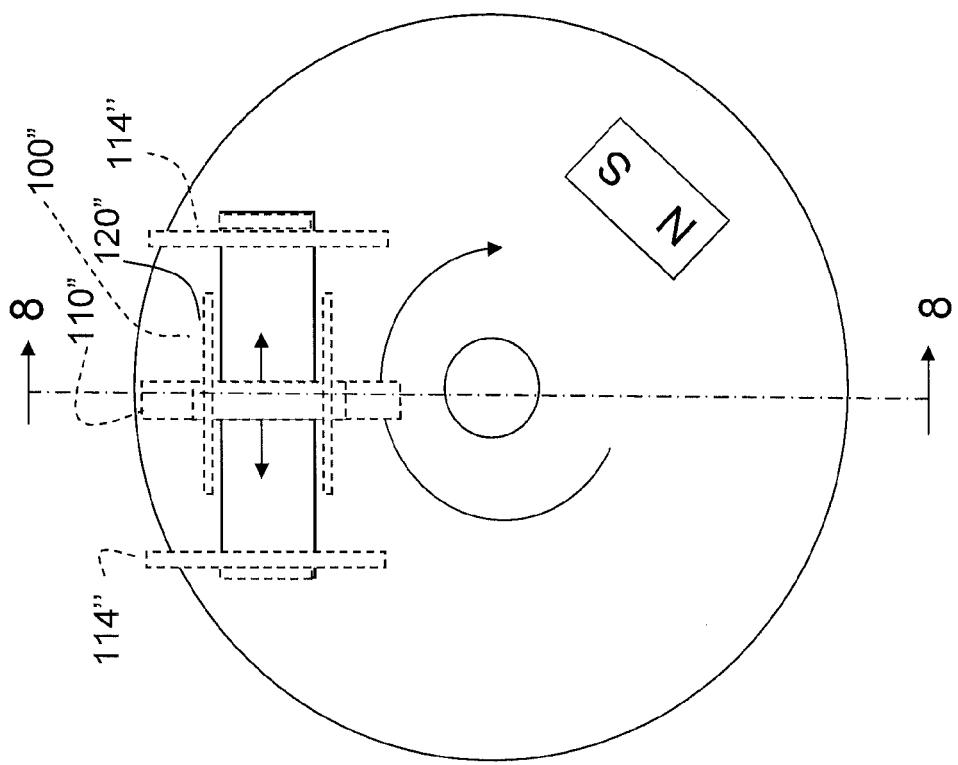
Figure 8
Figure 9
Figure 7

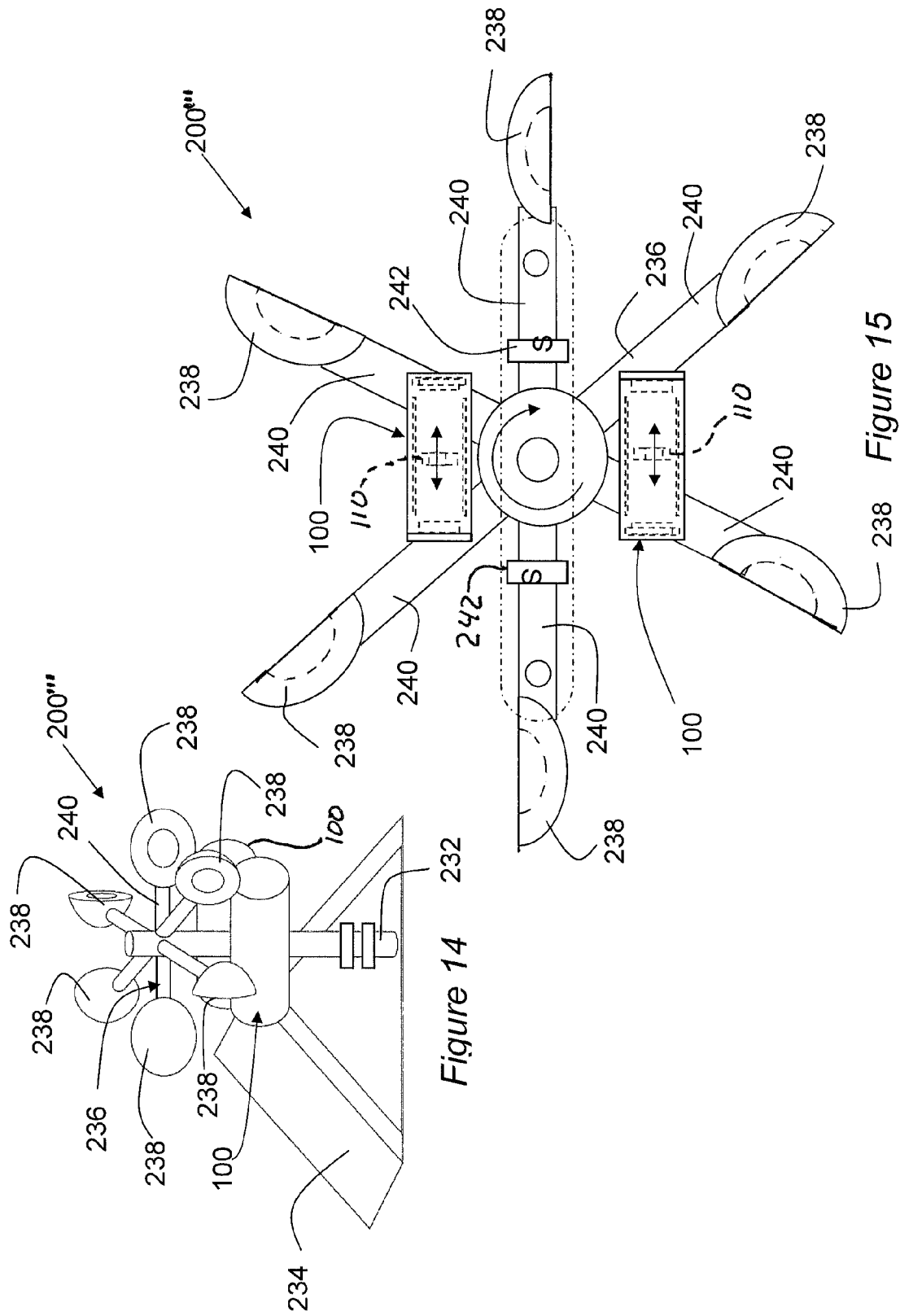

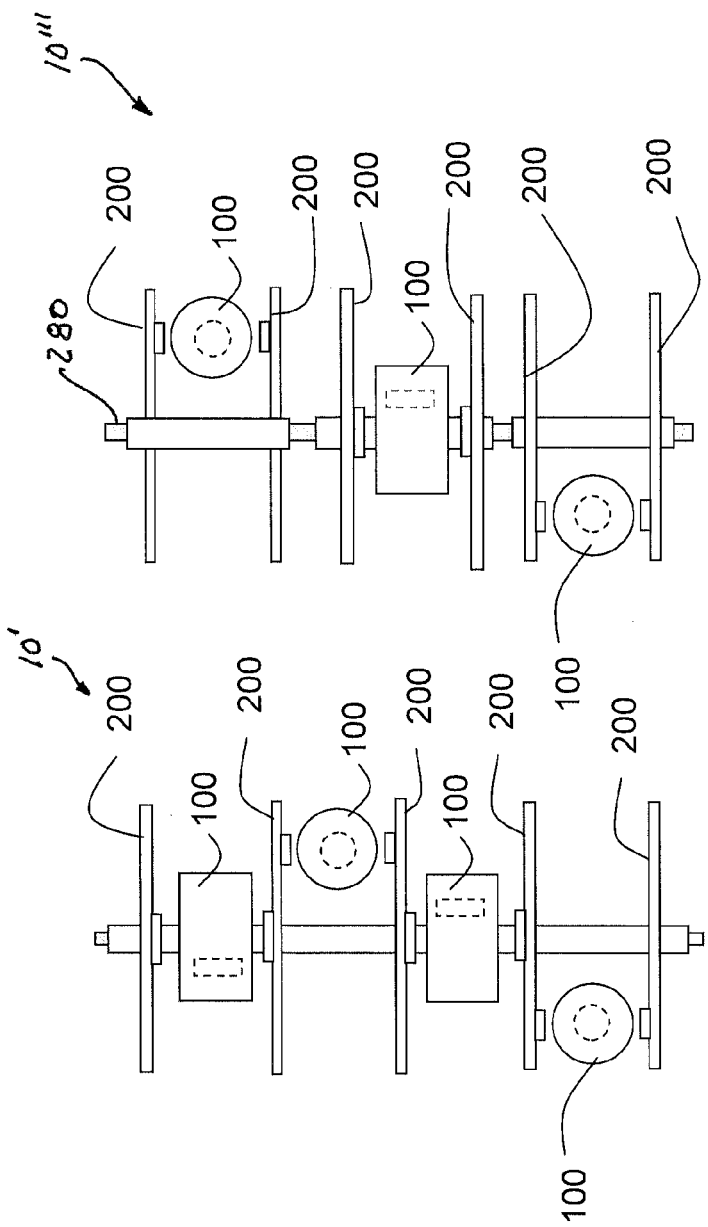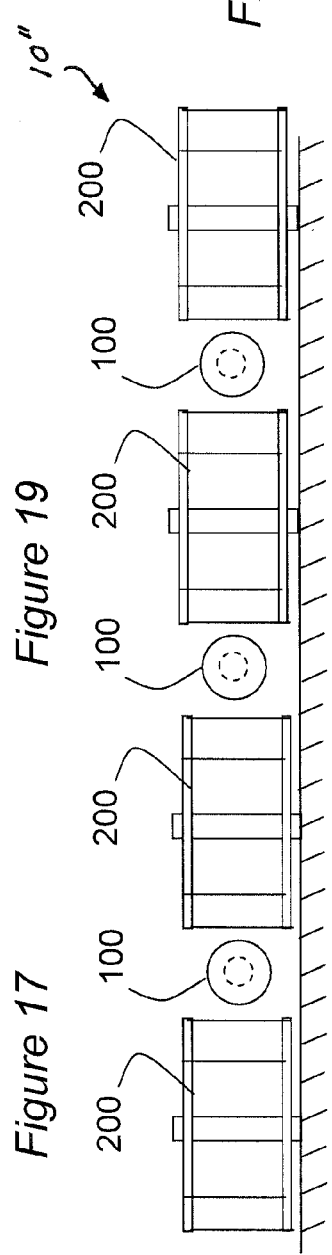

ROTATIONAL KINETIC ENERGY CONVERSION SYSTEM

CROSS-REFERENCE TO RELATED APPLICATIONS

This application claims the benefit of U.S. Provisional Patent Application Ser. No. 61/352,120, filed Jun. 7, 2010, entitled "ROTATIONAL KINETIC ENERGY CONVERSION SYSTEM," the contents of which is hereby incorporated by reference in its entirety. This application is related to provisional application Ser. No. 61/171,641, filed on Apr. 22, 2009, bearing the title "Kinetic Energy Conversion Device", and to Patent Cooperation Treaty Patent Application Serial Number PCT/US10/32037, filed Apr. 22, 2010, bearing the title "Energy Conversion Device". All disclosures in these prior applications are incorporated by reference herein.

TECHNICAL FIELD

This disclosure is related generally to energy conversion systems capable of inputting either mechanical energy and/or electrical energy and outputting electrical and/or mechanical energy. In particular, the energy conversion system is adapted for converting one form of input energy selected from a mechanical energy and electrical energy, into an output energy selected from a mechanical energy and electrical energy using an orbiting magnetic component and a reciprocating magnetic component, where the mechanical energy of the orbiting magnetic component is associated with a moving fluid.

BRIEF SUMMARY

A rotational kinetic energy conversion system for converting between kinetic energy and electric energy is provided, wherein an orbiting magnetic component interacts cyclically with a reciprocating magnetic component, such as a magnetic piston, to transfer energy therebetween.

An exemplary system comprises a magnetic piston reciprocable along a first axis, such as a first longitudinal axis, relative to a longitudinal frame, and an actuating magnet orbitable about a second longitudinal axis, to cyclically move towards and away from the magnetic piston. In particular, the magnetic piston may be associated with a fixed longitudinal frame defining the first longitudinal axis and the actuating magnet may be associated with a rotating frame defining and rotating about the second longitudinal axis. The interaction of the magnetic piston and the actuating magnet may be used to translate between reciprocating kinetic energy associated with the motion of the piston and rotational kinetic energy associated with the movement of the rotating frame and the actuating magnet.

The first and second longitudinal axes may be arranged perpendicular to each other. The first and second longitudinal axes may be non-intersecting. The actuating magnet may be displaced axially relative to the second longitudinal axis from the magnetic piston such that the orbital path of the actuating magnet avoids the actuating magnet touching the magnetic piston and cyclically takes the actuating magnet near and away from the magnetic piston.

Alternatively, the first longitudinal axis may be coplanar with the orbital path of the actuating magnet with the magnetic piston located radially outwardly of the orbital path.

Two or more magnetic pistons may be disposed circumferentially about the second longitudinal axis to cyclically interact with the actuating magnet at different angular positions of the actuating magnet in its orbital path about the second longitudinal axis. Two actuating magnets may be provided having orbital paths at different locations along with the second longitudinal axis, such as to cyclically bring the actuating magnets into magnetic interaction with opposite sides of the magnetic piston. Two magnetic pistons may be provided on opposite sides of the orbital path of an actuating magnet such as to cyclically interact with both actuating magnets. Similarly, a plurality of magnetic pistons and actuating magnets may be provided at various locations around and along the second longitudinal axis to create a multiple stage rotational kinetic energy conversion device.

The magnetic piston may be associated with a longitudinal frame and constrained by the longitudinal frame to reciprocate along the first longitudinal axis. In particular, the longitudinal frame may be a chamber enclosing the magnetic piston, defining the first longitudinal axis, and constraining the magnetic piston from displacing away from the first longitudinal axis. Alternatively, the longitudinal frame may be an axle defining the first longitudinal axis and the magnetic piston may be disposed around the axle and constrained by the axle from displacing away from the longitudinal axis. Additionally or alternatively, the magnetic piston may be constrained to reciprocate along the first longitudinal axis by one or more magnets disposed in fixed positions relative to the longitudinal frame. The magnetic piston may be associated with a winding or coil disposed about the first longitudinal axis to convert energy between the kinetic energy associated with the movement of the magnetic piston and electrical energy associated with current flowing through the winding or coil. The longitudinal frame may include a housing enclosing components associated with the magnetic piston.

The actuating magnet may be attached to a frame rotatable about the second longitudinal axis. The frame may utilize vanes, a propeller or any airfoil based variant utilizing a horizontal or vertical axis of rotation, a water wheel, a fan, a rotary pump or a rotary compressor or any other rotational device capable of converting between the kinetic energy of a moving fluid and the rotational kinetic energy of a rotating frame. Alternatively, the frame may be associated with a rotational kinetic energy conversion device such as a rotary electric motor or generator, a rotary pump, or a rotary compressor.

The actuating magnet may be polarized tangentially relative to its orbital path about the second longitudinal axis such as to present a first pole to the magnetic piston as it approaches the magnetic piston and second pole to the magnetic piston as it recedes from the magnetic piston. The magnetic piston may have a radial polarization component relative to the first longitudinal axis such as to present substantially the same magnetic pole to the actuating magnet as the actuating magnet approaches the magnetic piston and as it recedes from the magnetic piston.

The magnetic piston may have an axial polarization component relative to the first longitudinal axis to interact with axial end magnets in fixed positions at opposite ends of the longitudinal path of the magnetic piston to limit the movement of the magnetic piston and to act to restore the magnetic piston to the center of its longitudinal path.

In one exemplary configuration, one or more rotational kinetic energy conversion devices are placed in proximity with one or more linear kinetic energy conversion devices with the magnetic fields aligned such that the polarity of the actuating magnet is the same as the polarity of the opposing face of the piston as the actuating magnet rotates towards the piston. As the actuating magnets rotate towards the piston, the actuating magnetic field interacts with the movable piston magnetic field to push the piston towards a fixed end magnet. After the actuating magnet passes by the piston, the opposite axial fields of the fixed end magnet and the piston interact, and the piston is accelerated by the fixed end magnet in the opposite direction. At the same time the piston is being accelerated by the actuating magnet in a given direction, the piston approaches an end magnet which increasingly exerts a force on the piston to slow the piston down and ultimately reverse its direction of motion. This process is repeated continuously, resulting in an oscillation of the piston inside a winding that generates electrical energy. The piston can travel at multiples of the actuating magnet frequency.

BRIEF DESCRIPTION OF THE DRAWINGS

Some configurations of the energy conversion device will now be described, by way of example only and without disclaimer of other configurations, with reference to the accompanying drawings, in which:

FIG. 7 is a schematic representation of an alternative exemplary rotational kinetic energy conversion system;

FIG. 8 is a sectional view of the rotational kinetic energy conversion system of FIG. 7 taken along section line 8-8 thereof;

FIG. 9 is an exploded view of an exemplary linear kinetic energy conversion device that may be employed with the rotational kinetic energy conversion system of FIGS. 7 and 8;

FIG. 14 is a perspective view of another alternative rotational kinetic energy conversion system including a vane style fan with six cups and two linear kinetic energy conversion devices;

FIG. 15 is a bottom plan view of the rotational kinetic energy conversion system of FIG. 14;

FIGS. 17, 18 and 19 are schematic views of other rotational kinetic energy conversion systems including multiple rotational kinetic energy conversion device component and multiple linear kinetic energy conversion devices.

DETAILED DESCRIPTION OF THE DISCLOSURE

Figure 2:
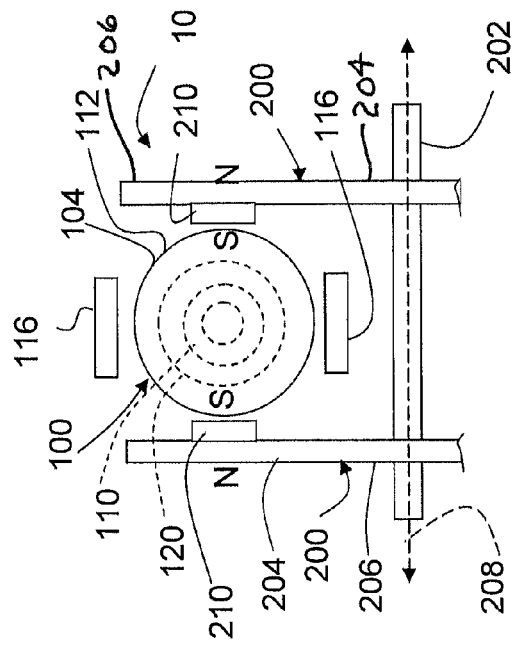
FIG. 2 is a partial sectional view of a rotational kinetic energy conversion system taken along section line 2-2 of FIG. 1.

Referring now to the drawings, exemplary energy conversion devices are shown in detail. Although the drawings represent alternative configurations of energy conversion devices, the drawings are not necessarily to scale and certain features may be exaggerated to provide a better illustration and explanation of a configuration. The configurations set forth herein are not intended to be exhaustive or to otherwise limit the device to the precise forms disclosed in the following detailed description.

Figure 1:
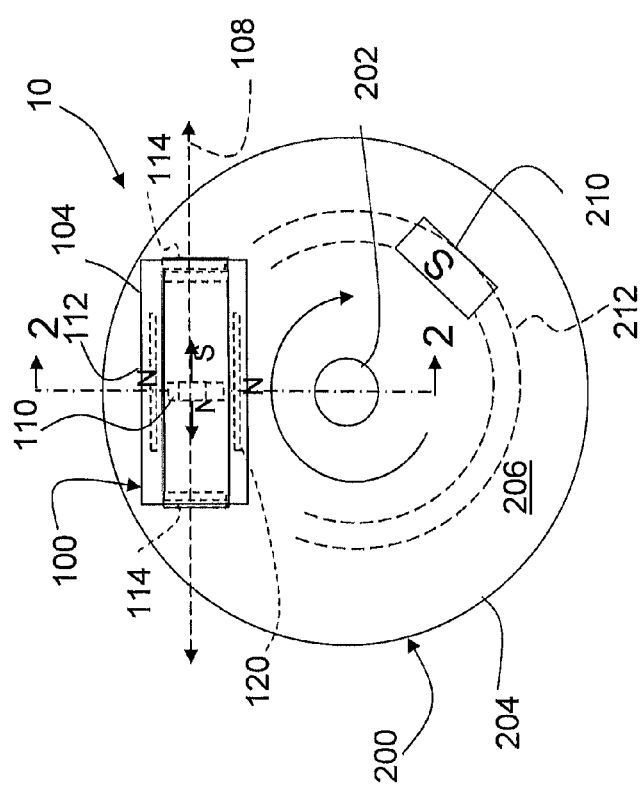
FIG. 1 is a schematic representation of an exemplary rotational kinetic energy conversion system.

Referring to FIGS. 1 and 2 schematically illustrating a generalized rotational kinetic energy conversion system 10, the general arrangement of the mechanical, magnetic and electromagnetic components of energy conversion system 10 will be described. In particular, FIGS. 1 and 2 provide a schematic representation of the exemplary rotational kinetic energy conversion system 10 having an exemplary linear kinetic energy conversion device 100 and an exemplary rotational kinetic energy conversion device 200. Exemplary alternative kinetic and rotational kinetic energy conversion devices are illustrated in other figures and described later herein.

With continued reference to FIGS. 1 and 2, linear kinetic energy conversion device 100 has a fixed frame 104, defining a first longitudinal axis 108 (see FIG. 1). A complex magnetic piston 110 is constrained by mechanical and/or magnetic means, to be reciprocable along first longitudinal axis 108 about the center position in which it is illustrated. Fixed frame 104 may include a housing 112 surrounding the piston 110, as well as axial end magnets 114 (see FIG. 2) and/or radial side magnets 116 (see FIG. 2) capable of interacting with the piston 110, as will be described later herein, to position the piston 110 within the housing 112. Additional configuration details and alternative configurations for the fixed frame 104 will be described later herein. Fixed frame 104 may be provided with a coil or toroidal winding 120 capable of interacting with complex magnetic piston 110 to generate an electrical current in the winding in response to oscillation of the magnetic piston along first longitudinal axis 108.

Rotational kinetic energy conversion device 200 has a rotatable frame 204 mounted, for example to a shaft 202 defining a second longitudinal axis 208 (see FIG. 2) about which rotatable frame 204 is constrained to rotate. The rotatable frame 204 may be powered by hydro, wind or solar energy. Hydro power may be harnessed by using river current or the wave action of lakes and oceans, such as using the systems illustrated in FIGS. 10 through 13 and described later herein. Wind power may be harnessed by using a "squirrel cage" design, propellers or blades, or cups, as illustrated variously in FIGS. 14 through 16 and described below. Solar power may be used as a supplemental power supply as a backup, to power control systems, or to selectively operate optional additional windings when the wind is less than optimal, as described later herein.

The rotatable frame 204 may include one or two wheels 206, as shown in FIG. 2, which extend to locations adjacent the linear kinetic energy conversion device 100. One or more actuating magnets 210 are fixed to portions of the rotatable frame 204 remote from the second longitudinal axis 208, and define circular orbital paths 212 (see FIG. 1) about longitudinal axis 208 when the rotatable frame 204 is rotated thereabout. As shown in FIG. 2, the rotatable frame 204 may be provided with two actuating magnets 210, one disposed generally on each side of the linear kinetic energy conversion device 100 to engage opposite sides thereof. Providing opposing actuating magnets 210 provides a balanced force on the piston 110 and therefore reduces potential friction between the piston 110 and components of the fixed frame 104. Additional actuating magnets may be provided at different angular positions about the second longitudinal axis to also selectively interact with the piston 110. It will be appreciated that the components may be scaled dimensionally and in magnetic strength and weight so as to provide a smooth reciprocation or oscillation of the piston 110 for the expected range of rotational speeds of the rotatable frame 204. The oscillation frequency of the piston 110 may be the same or greater than the rotational frequency of the magnet 210 or magnets.

Rotatable frame 204 may be rotated by a moving fluid, such as air or water, by the use of vanes, or similar devices, described later, so as to capture the kinetic energy of the moving fluid. It will further be appreciated that the fixed frame 104 may be fixed in position relative to the second longitudinal axis 208 and the rotatable frame 204 by any convenient means. The support structure for devices 100 and 200 has been omitted from FIGS. 1 and 2 to provide clearer visibility of the components of these devices. In use, as the rotatable frame 204 rotates, the actuating magnets 210 orbit the second longitudinal axis 208 into and out of the range of the complex magnetic piston 110 to cyclically interact with the complex magnetic piston and cause the oscillation of the piston 110 relative to the fixed frame 104. This oscillation of the piston 110 generates a current in the toroidal winding 120, thereby permitting the rotational kinetic energy conversion system 10 to convert the kinetic energy of a moving fluid to rotational kinetic energy of the rotatable frame 204, then into linear kinetic energy of the piston 110, and finally into electrical power in the form of electric current through the toroidal winding 120.

The efficiency of the conversion of the kinetic energy of the moving fluid into electric power will depend on the efficiency of the transfer of energy from one stage to the next stage in the rotational kinetic energy conversion system 10. This may be advanced by choosing appropriate lightweight materials for all components, as well as by scaling the magnetic components and choosing their relative polar orientations to optimize the efficient operation of the system 10. It is therefore contemplated that all of the magnets used in the energy conversion system 10 may be rare earth magnets, such as neodymium magnets, to provide the desired strength combined with a low weight.

It is therefore contemplated that the complex magnet piston 110 be manufactured or selected so as to have an axial magnetic component and a radial magnetic component. The axial magnetic component may interact with axial end magnets 114 to limit the movement of the piston 110 and to accelerate the piston 110 to return to its central position in the fixed frame 104, while the radial magnetic component may interact with the toroidal winding 120 to generate electrical current. The axial magnetic component is also used to interact with actuating magnets 210. The radial magnetic component may also interact with radial side magnets 116 to help position the piston and reduce friction. Therefore, as shown in FIG. 1, complex magnetic piston 110 may be manufactured or selected to effectively present axial poles of identical polarity to the respective faces presented by the axial end magnets 114, as well as to effectively present radial poles of identical polarity to that presented by the radial side magnets 116. Furthermore, the actuating magnets 210 may be selected and oriented, as shown in FIG. 1, so as to effectively present a face of identical polarity to the radial magnetic component of the piston 110 as the actuating magnets approach the piston and to effectively present a face of identical polarity to the radial magnetic component of the piston 110 as the actuating magnets pass and retreat from the piston along their orbital paths. More particularly, as the actuating magnet 210 moves towards the piston 110, the interacting faces of the piston 110 and actuating magnet 210 repel each other, causing the actuating magnet 210 to impart a force on the piston 110 moving it towards an end magnet. When the actuating magnet 210 passes the piston 110, the opposite faces of the piston 110 and actuating magnet 210 begin interacting and the piston 110 is pushed in the opposite direction. The end magnets 114 also act on the piston to slow and eventually reverse its direction of motion.

It will be appreciated that opposing polarities may be substituted for identical polarities in the above described configurations for many applications such that magnet 210 attracts the piston 110 and accelerates it towards the axial end magnet, provided that each of the polarities are selected so that the forces balance to produce the desired action of the piston 110.

Figure 3:
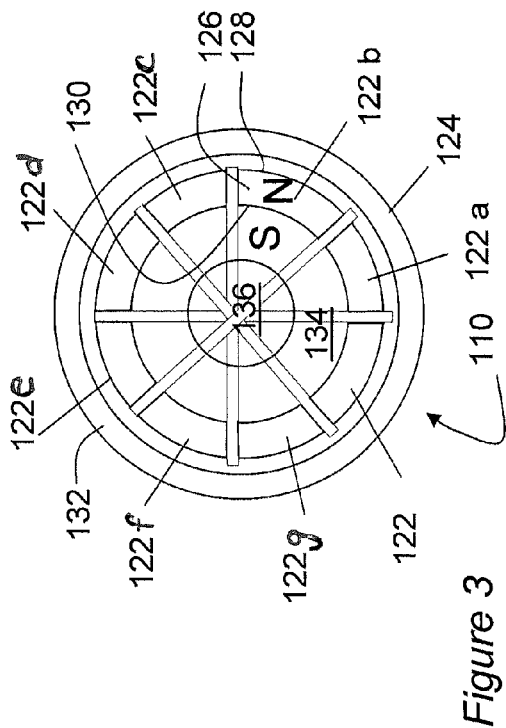
FIG. 3 is an enlarged sectional view through a complex piston of the linear kinetic energy conversion device of FIG. 2.

This complex magnetic design for the complex magnetic piston 110 may be provided for example, by constructing the piston of two concentrically disposed magnets, one being magnetized axially and one being magnetized radially, so as to provide a complex field. This may alternatively be provided as shown in FIG. 3, by constructing the complex magnetic piston 110 from a plurality of magnetic segments 122a-122h manufactured individually and then enclosed in a ring 124, as shown, or fastened together by an epoxy material. Ring 124 may be comprised of aluminum and have an outer cylindrical wall 132 and at least one annular wall 134 for engaging the magnetic sections. Annular wall 134 may have a centrally located aperture 136 for use in mounting complex magnet 110 to other components, such as a shaft, when required for some applications.

Complex magnetic piston 110 may be a radial neodymium ring magnet of the type sold by Engineered Concepts, 1836 Canyon Road, Vestavia Hills, Ala. 35216, owned by George Mizzell in Birmingham, Ala., and offered for sale under the name SuperMagnetMan, for example, as parts number RR0060N, RR0090N, or, RR0100S. Applicants have determined experimentally that such magnets have the property of having an axial magnetic component such as to effectively present a north pole on one face 126 and a south pole on an opposite face not shown, while also having a radial component presenting a first pole, such as a north pole on first arcuate face 128, and an opposite pole, such as a south pole, on a second arcuate face surface 130.

For example, an acceptable complex piston 110 has been manufactured using eight separate grade N42 diametric magnet segments. For some applications, a weaker complex piston may be suitable made from grade N40 or grade N32 diametric magnet segments, since it is easier to assemble using weaker magnet segments. It has been suggested experimentally that such variables as the gauss strength, strength and length of the piston 110 magnetic field, as well as the speed (oscillations) of the radial magnet be maximized. The addition of a second radial magnet also appears experimentally to be helpful. However, from experiments to date, it appears that the most important variables to maximize are the gauss strength and radial magnetic strength and therefore a piston made from a grade N52 magnet may be desirable.

Figure 4:
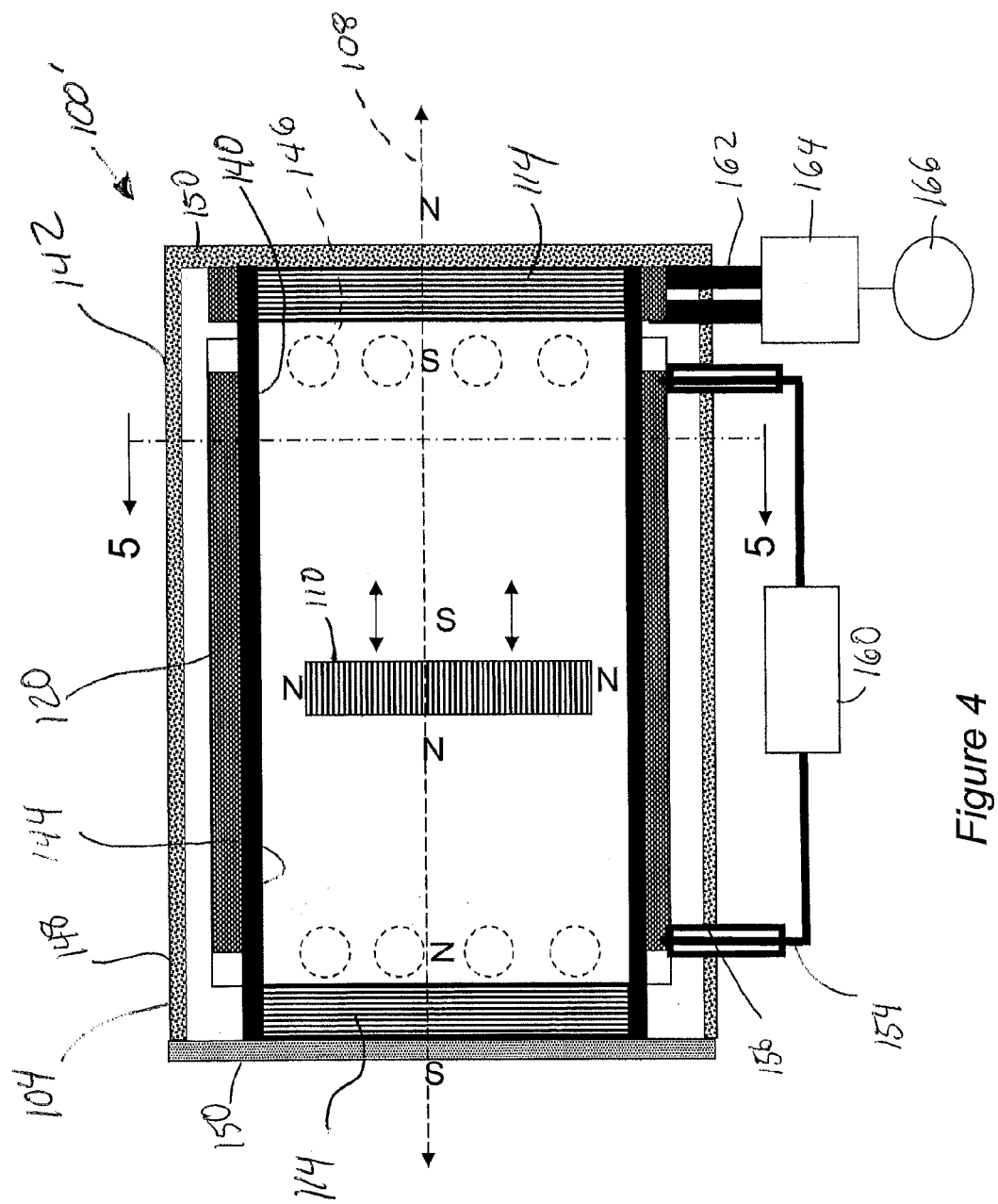
FIG. 4 is a side sectional view of an exemplary linear kinetic energy conversion device that may be employed with the rotational kinetic energy conversion system of FIGS. 1 and 2.
Figures 5, 6:
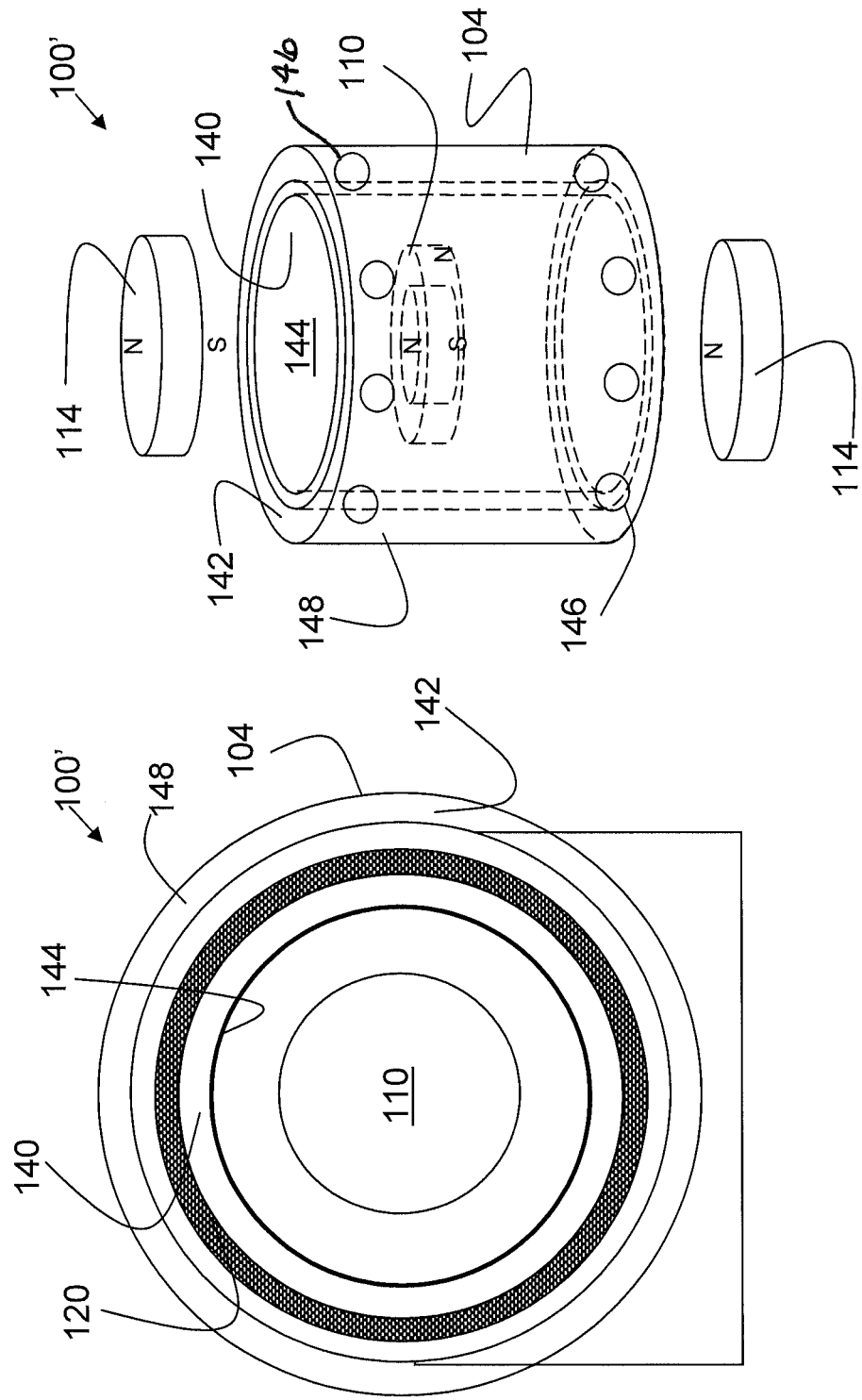
FIG. 5 is a sectional end view of a linear kinetic energy conversion device taken along section line 5-5 of FIG. 3.
FIG. 6 is an exploded view of the linear kinetic energy conversion device of FIGS. 4 and 5.

Additional details and alternatives for a linear kinetic energy conversion device 100' are shown in FIGS. 4 through 6. Fixed frame 104 of device 100' includes a tube or inner housing 140 formed of a suitable non-conductive material, such as plastic, supporting a toroidal winding 120 (see FIGS. 4 and 5) therearound and a pair of axial end magnets 114 (see FIGS. 4 and 6) at each end of the inner housing 140.

It should be noted that a second winding may be employed, which when selectively energized, temporarily upsets the balance of forces acting on piston 110 so as to initiate or assist the oscillation of piston 110. It will be appreciated that oscillation of piston 110 may additionally or alternatively be initiated or assisted by mechanical action causing piston 110 to move relative to the other magnetic components. Alternatively, a plurality of toroidal windings 120 may be provided. One or more passive toroidal windings may be provided to create an output current as a function of the motion of the piston. One or more active toroidal windings may be provided to create a magnetic field opposing the magnetic field of the piston. The passive toroidal winding 120 is significantly larger than the active toroidal winding. A passive winding may be operated by solar power when the wind is less than optimal. The energy created by the piston interacting with the passive toroidal winding may be transferred to and stored in an electrical device such as a battery or capacitor. The active toroidal winding, not shown, may use the electrical energy previously created by the moving piston magnets interacting with the passive toroidal winding.

The inner housing 140 defines a channel 144 for the piston 110. The toroidal winding 120 may be sized as shown to extend only partially towards the ends of inner housing 140 to provide a gap of more than the thickness of the piston 110 so that the field is broken as the piston approaches the end magnets 114, causing an electrical spike in the current generated in the toroidal winding 120.

Fixed frame 104 may further include an outer housing 142 enclosing the inner housing 140, the toroidal winding 120 and the end magnets 114. The outer housing 142 may include a cylindrical wall 148 closed at each end by a wall 150 (see FIG. 4) to form an enclosure for the magnetic components of kinetic energy conversion device 100'. Axial end magnets 114 may be affixed to or abut walls 150. It should be noted that in FIGS. 4-6, piston 110 is shown spaced away from inner housing 140 so as to avoid loss of energy to friction between components. However, piston 110 may be proportioned with a sufficiently large diameter relative to the inner diameter of toroidal winding 120 to restrict airflow between the sides of piston 110. To prevent air pressure buildup on ether side of piston 110 from inhibiting the motion of piston 120, housing 112 may be provided with openings 146 (see FIGS. 4 and 6) permitting airflow to the respective sides of the piston 110. The openings 146 may also provide some cooling of the internal components of the linear kinetic energy conversion device 100'.

As shown in FIG. 4, wires 154 (see FIG. 4) for taking power from the toroidal winding 120 extend through apertures 156 in cylindrical wall 148 to an electrical load 160, such as an external powered device, a power grid, or an energy storage device. Wires 162 for connecting toroidal winding 120 to a power source 164, selectively operated by a switch, 166, activated automatically, such as by a microprocessor, or activated manually, may be provided when it is desired to introduce a temporary magnetic imbalance to piston 110 to initiate the oscillation of the piston for applications where priming is required. The microprocessor may be operated by solar power when the wind is less than optimal. Alternatively, wires 154 and 162 may be replaced by a wireless power transmission system.

Linear energy conversion device 100' may be configured to provide either alternating current or direct current output. Electrical load 160 may be one or more electrical devices capable of consuming the power, one or more storage devices used to store power for later use, or a power distribution system. Exemplary storage devices for electrical load 160 include batteries, flywheels, capacitors, and other devices of capable of storing energy using electrical, chemical, thermal or mechanical storage systems. Exemplary electrical devices for electrical load 160 include electric motors, fuel cells, hydrolysis conversion devices, battery charging devices, lights, and heating elements. Exemplary power distribution system electrical load 160 includes a residential circuit breaker panel, or an electrical power grid. Electrical load 160 may also include an intermediate electrical power conversion device or devices capable of converting the power to a form useable by electrical load 160 such as an inverter.

While power source 164 and electrical load 160 are schematically illustrated as independent of linear kinetic energy conversion device 100', either or both may be integrated with a linear kinetic energy conversion device 100' or connected with linear kinetic energy conversion device 100' in some manner. In particular, one or both may alternatively be affixed to outer housing 142 or mounted within a compartment formed on outer housing 142. Furthermore, while power source 164 and electrical load 160 are schematically illustrated as being tangentially located relative to the first longitudinal axis 108, either or both may be advantageously located along longitudinal axis 108 for some implementations. Thus, for example, but not illustrated, outer housing 142 may extend beyond one of the end magnets 114 to provide a compartment for the storage of a power source 164 or electrical load 160 such as batteries, a radio, or a light. Additionally or alternatively, a removable cover, not shown, may be provided at one end of outer housing 142 with a compartment or attachment feature for a power source or an electrical load or for replacement of their components. The radio or light may be operated on solar power, batteries or power from a power grid when the wind is less than optimal.

Outer housing 142 may be provided with appropriate legs or mounting points for selectively mounting the linear kinetic energy conversion device 100' to a stationary structure, such as a tower for an airfoil based rotating wheel.

It should be noted that exemplary linear energy conversion device 100' does not include a radial magnetic source such as the radial side magnets 116 shown in FIGS. 1 and 2, as their use is optional depending on the application.

Referring now to FIGS. 7 through 9, another exemplary linear kinetic energy conversion device 100" is illustrated. Device 100" is similar to device 100' except as described below. In linear kinetic energy conversion device 100", complex magnetic piston 110" is disposed outside of a toroidal winding 120" and a pair of ring shaped axial end magnets 114" (see FIGS. 7 and 9) are provided for acting upon the complex magnetic piston 110".

Having described above alternative examples of the linear kinetic conversion device 100, attention is now drawn to FIGS. 10 through 16 illustrating alternatives examples of the rotational kinetic energy conversion device 200.

Figure 10:
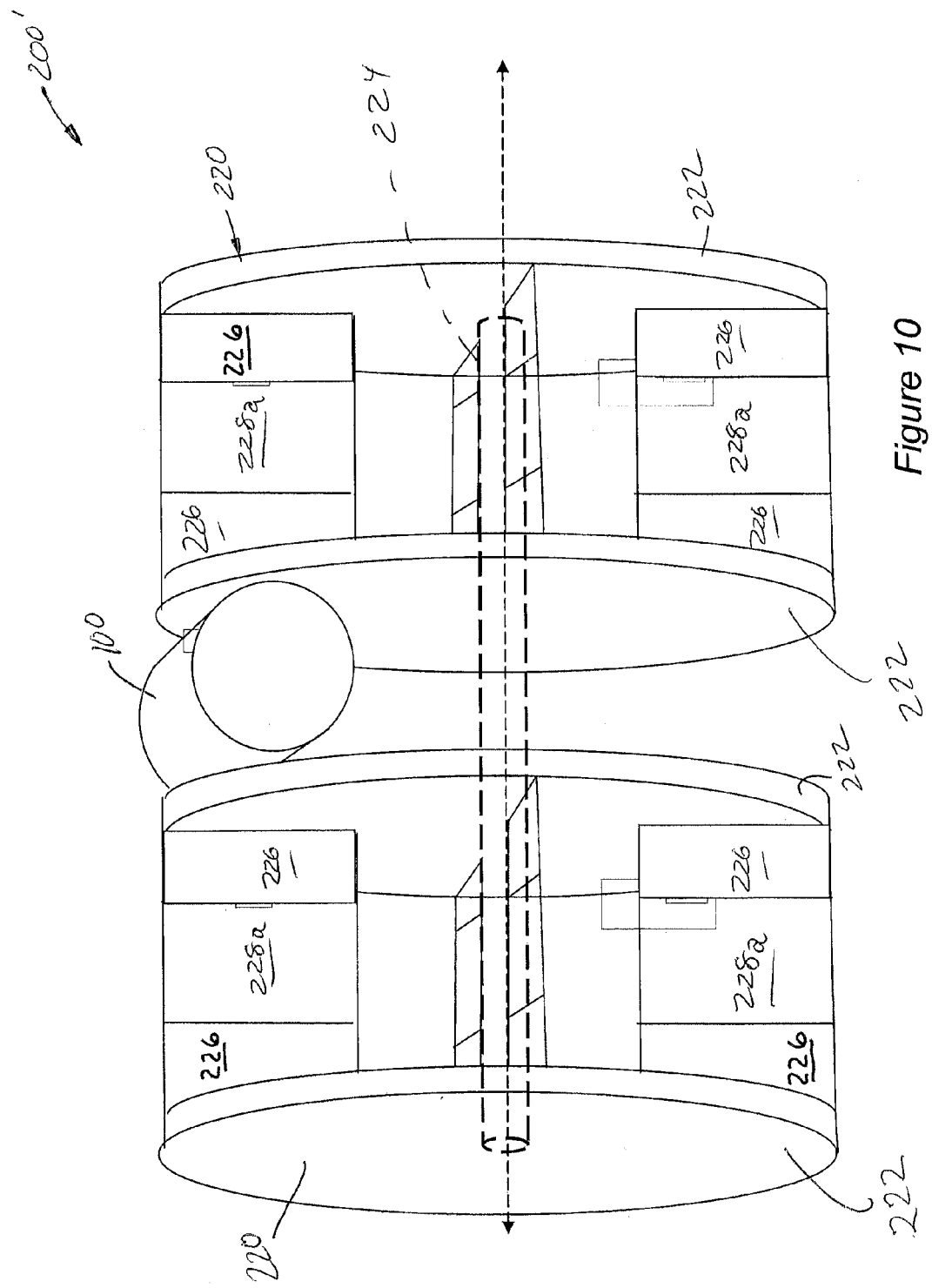
FIG. 10 is a schematic perspective view of an alternative exemplary rotational kinetic energy conversion system including a linear kinetic energy conversion device arranged between two paddle type fluid driven fans.
Figure 11:
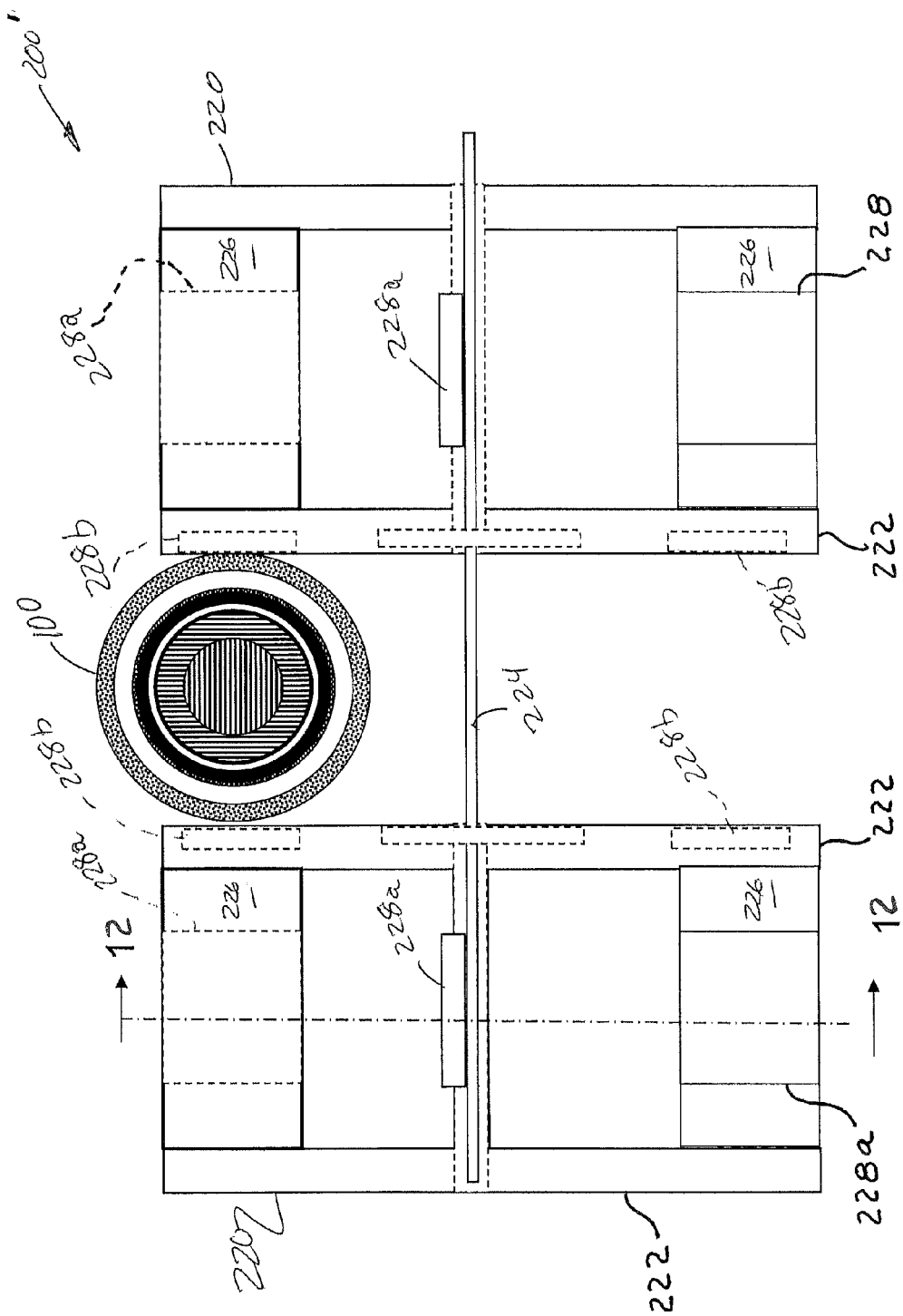
FIG. 11 is a front elevational view of the rotational kinetic energy conversion system of FIG. 10 illustrating alternative locations for actuating magnets and illustrating the linear kinetic energy conversion device in section.
Figure 12:
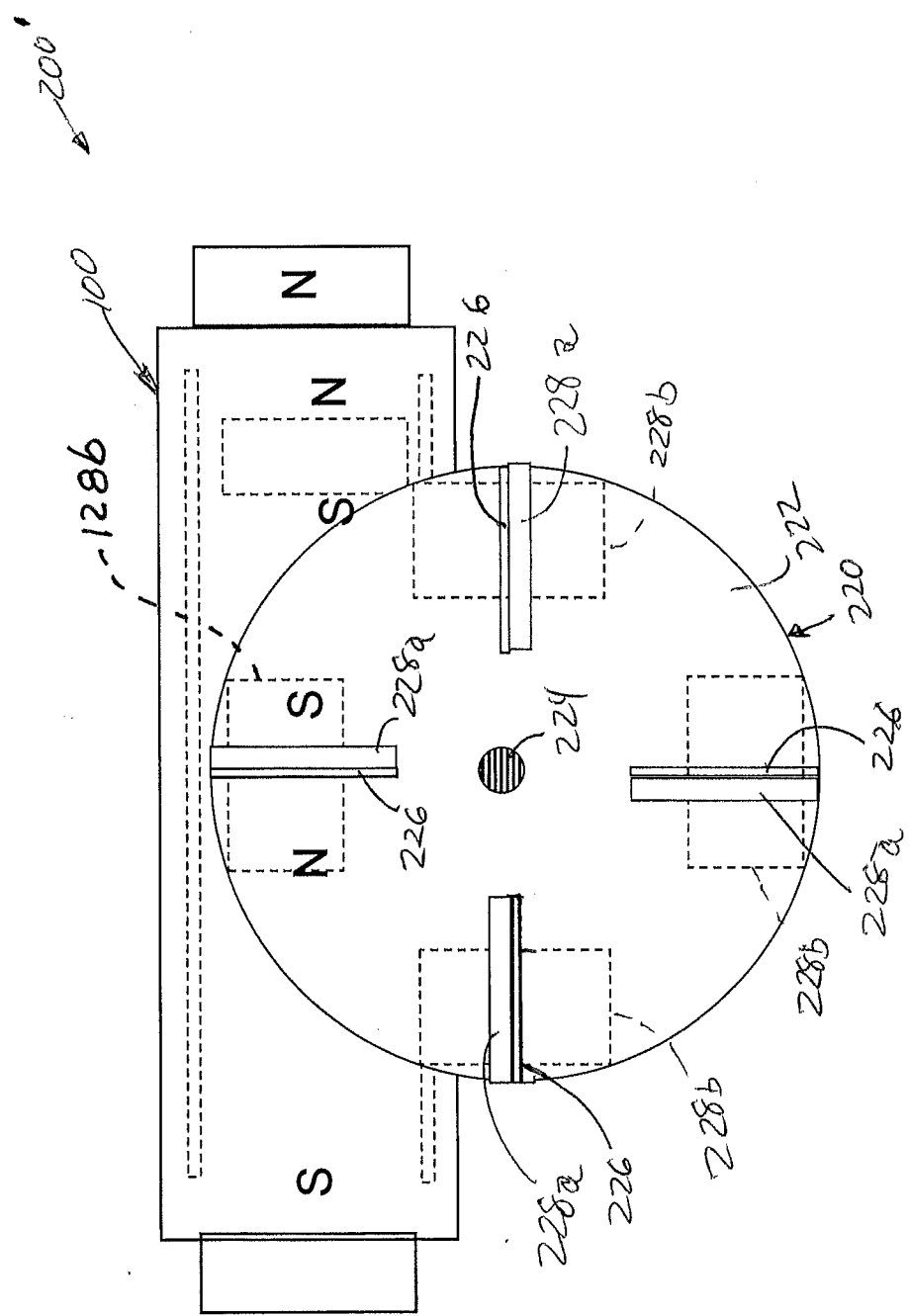
FIG. 12 is a sectional view through an exemplary fluid driven fan taken along section line 12-12 of FIG. 11.

A first exemplary rotational kinetic energy conversion device 200', illustrated in FIGS. 10 through 12 using a rotating wheel 220 to convert the kinetic energy of flowing water into rotational kinetic energy. In particular, the rotating wheel 220 has two spaced apart disk shaped walls 222 mounted to an axle 224 and a plurality of fluid resisting surfaces, such as paddles, vanes or blades 226 extending between the walls 222 radially from the axle 224. When the rotating wheel 220 is partially submerged in moving water, the water will act upon the blades 226 to cause the rotation of the water wheel. Actuating magnets 228a may be mounted to the face of each blade. Alternatively, actuating magnets 228b (see FIGS. 11 and 12) may be mounted to a face of one of the walls 222. A linear kinetic energy device 100 may be mounted in a fixed position adjacent one of the walls 222. As shown in FIG. 11, as the water wheel 220 turns, actuating magnets 228a and 228b interact with the piston 110 in the linear kinetic energy device 100 in the manner described previously to generate electrical power. As shown, the linear kinetic energy device 100 may be mounted between two adjacent water wheels 220 and receive energy from both wheels.

Figure 13:
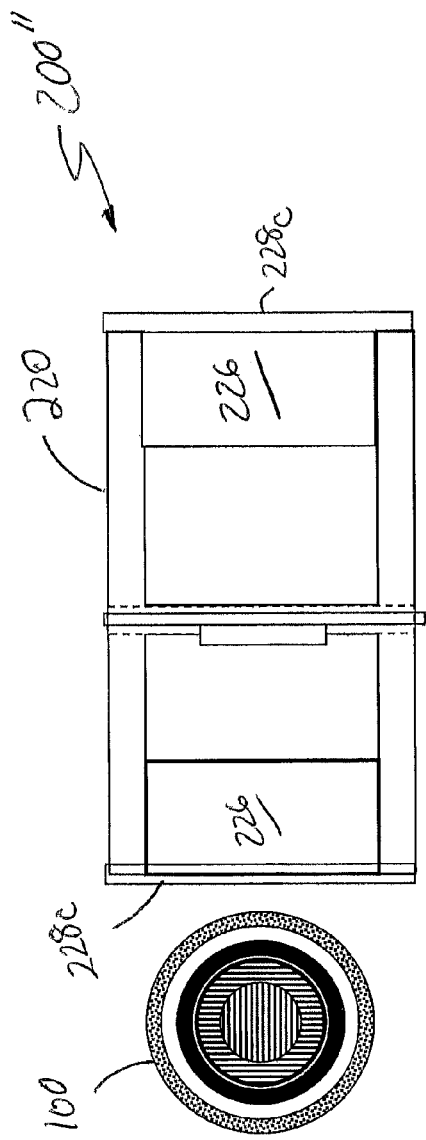
FIG. 13 is a front elevational view of an alternative rotational kinetic energy conversion system having a fluid driven fan arranged coplanar with a linear kinetic energy conversion device.

An alternative exemplary rotational kinetic energy conversion device 200" is illustrated in FIG. 13. Device 200" is similar to device 200' except as described below. In particular, kinetic energy conversion device 200" has a rotating wheel 220 designed to interact with a linear kinetic energy device 100 disposed in the same plane as the rotating wheel. In this case, then, actuating magnets 228c may be located on the edges of the blades 226. An additional rotating wheel, not shown, may be provided coplanar with the illustrated rotating wheel on the other side of the linear kinetic energy device 100. Wind may also drive this rotating wheel.

Another alternative exemplary rotational kinetic energy conversion device 200''' is illustrated in FIGS. 14 and 15. Device 200''' comprises a post 232, mounted in turn to fluid resisting device 238, and attached, for example, to a building 234. The device has a rotating frame 236 rotatably mounted to the post 232. The device 200''' has a plurality of blades, for example cups 238, mounted on the ends of arms 240 extending radially from the post 232. A pair of linear kinetic energy devices 100 are fixedly mounted to the post 232 adjacent the rotating frame 236 at opposing radial locations about the post. As shown in FIG. 15, a plurality of actuating magnets 242 are mounted to the arms 240 such as to cyclically sweep by the linear kinetic energy device 100 and thereby interact with the piston 110 in the linear kinetic energy device 100 in the manner described previously to generate electrical power.

Figure 16:
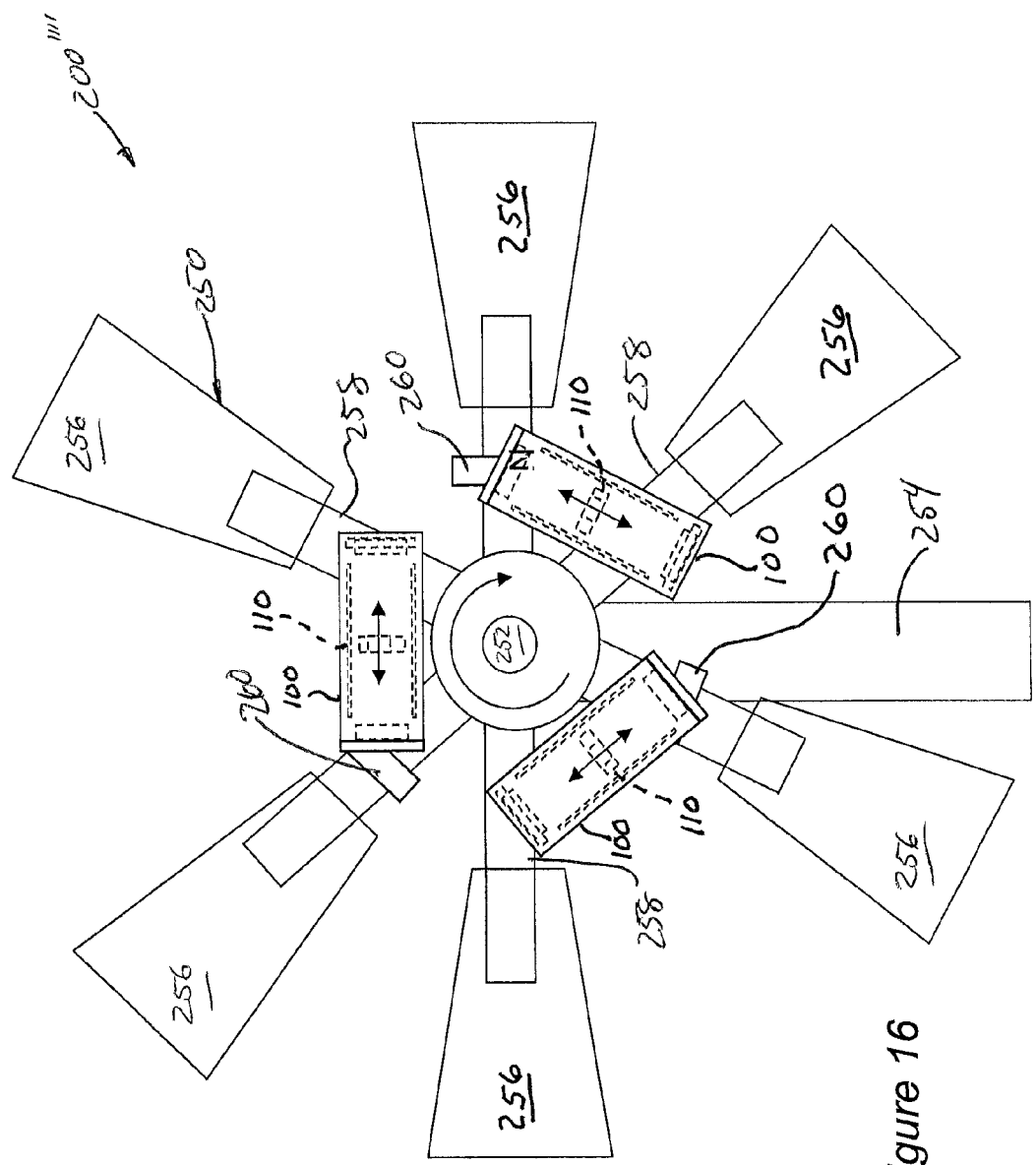
FIG. 16 is a front elevational view of yet another alternative rotational kinetic energy conversion system including a blade style fan with six paddles and three linear kinetic energy conversion devices.

Yet another alternative exemplary rotational kinetic energy conversion device 200'''' is illustrated in FIG. 16. Device 200'''' comprises a wind resisting vane 250 mounted to a axle 252 extending generally perpendicularly from a vertical post 254, which may be mounted in turn, to the ground.

Device 200'''' has a plurality of blades or vanes 256 mounted on the ends of arms 258 extending radially from the axle 252. As shown in FIG. 16, the arms 258 may be cylindrical rods. Alternatively, the arms 258 may be shaped to capture a portion of the wind, such as by being shaped as propellers or turbine blades or any airfoil configuration. Three linear kinetic energy devices 100 are fixedly mounted to the post 254 at arcuately spaced locations about the axle 252. A plurality of actuating magnets 260 are mounted to the arms 258 such as to cyclically sweep by the linear kinetic energy device 100 and thereby interact with the piston 110 in the linear kinetic energy device 100 in the manner described previously to generate electrical power.

Referring now to FIGS. 17 through 18, alternative rotational kinetic energy conversion systems 10', 10'' and 10''' are illustrated, respectively, where multiple linear kinetic energy conversion devices 100 and rotational kinetic energy conversion devices 200 are used to capture power from a moving fluid.

In rotational kinetic energy conversion systems 10' and 10'', shown in FIGS. 17 and 18, respectively, linear kinetic energy devices 100 and rotational kinetic energy devices 200 are alternated so that linear devices get power from two adjacent rotational devices and rotational devices provide power to two adjacent linear devices. In rotational kinetic energy conversion system 10' the rotational devices are coaxial, while in rotational kinetic energy conversion system 10'', the rotational devices have parallel axis and the linear devices are coplanar with the rotational devices. The choice between these orientations may depend on the nature and direction of the fluid flow and geometry of the space available for mounting the system.

In rotational kinetic energy conversion systems 10''', shown in FIG. 19, each linear kinetic energy device 100 is disposed between a pair of rotational kinetic energy devices 200, but comprise a subsystem independently rotatable about an axle 280.

It will therefore be appreciated that an energy conversion system may be configured as a single stage, as shown in FIGS. 1 through 16, multiple independent stages, as shown in FIGS. 17 and 19, or as multiple coupled stages, as shown in FIG. 18. When constructed with multiple stages, the individual stages may share components, such as outer or inner housings or electrical devices. Multiple linear energy conversion devices from one or more stage may be connected electrically or mechanically in parallel or in series or function independently.

It is to be understood that the above description is intended to be illustrative and not restrictive. Many configurations and applications other than the examples provided would be apparent to those of skill in the art upon reading the above description.

For example, while in the above described exemplary structures, the rotational kinetic energy conversion device 200 received power from a moving fluid and the linear kinetic energy conversion device 100 received that energy and converted into electrical power, the components of the rotational kinetic energy conversion system 10 may be varied to provide alternative category of power inputs or outputs for either of the devices 100 and 200. For example, the linear kinetic energy device 100 could be powered, so that the toroidal winding 120 drives a piston 110 to interact with actuating magnets on a rotatable frame so as to drive a fan. Energy conversion devices 100 and 200 may be used alternatively as a generator, a motor, a pump, a compressor, an engine, or an electrical power transformer.

Relative motion between the piston 110 and the toroidal winding 120 may be caused by any mechanical action such as wind, hydro (wave, current or vertical drop energy), or mechanical input from moving or bouncing objects. Alternatively, the energy conversion device may transmit power to a device or devices capable of utilizing the electrical output of the toroid without using intermediate storage. These devices include, but are not limited to, electric motors, fuel cells, hydrolysis conversion devices, battery charging devices, lights, and heating elements. Alternatively, the piston may be directly displaced by a fluid acting directly on a face of the piston, such as moving air or water, a combustible fuel expanding against one face of the piston, or a fluid expanding or contracting in response to a temperature change.

It will be appreciated that the energy storage device described above may be acting in concert with and providing an input, either primary or secondary, to an individually circuited system such as a residential home fuse panel fed by a commercial power grid or to a hydro, nuclear, wind, solar, wave, or any other type of electrical power generation grid such as used for private and/or public power consumption. The device may be a singular entity or multiple entities combined as units in series, parallel or independently to provide increased output. The device may be capable of acting in concert with an electrical device capable of calculating and regulating the input energy to the active toroid such that the piston motion is maintained. The device may, acting in concert with an electrical device capable of calculating and regulating the input energy to the active toroidal winding, e.g., an electronic control module capable of being programmed, reading input signals and generating output signals based on the input signals such that the piston motion is decelerated, stopped and reversed with minimum input energy to the active toroidal winding.

Control algorithms may be provided capable of deriving piston deceleration and acceleration and calculating the required toroidal energy needed to accelerate the piston to its required velocity and generating a current and voltage input signal for the active toroidal winding. The algorithm would minimally require input signals consisting of piston travel at three different positions, e.g., using Hall effect sensors, each sensed position being past the piston mid-travel point along the longitudinal axis toward a horizontal magnet, calculating the time between the three pulses to derive velocity and deceleration for two time periods, calculating the deceleration rate as a function of piston position, calculating the point at which the piston will stop, determining the force necessary to accelerate the piston to the desired initial velocity, calculating the required toroidal winding force required, generating a current command signal (for a fixed voltage) and measuring the acceleration as the piston travels in the opposite direction along its longitudinal axis and adjusting the toroidal power level to maintain the required piston target velocity by measuring the time required to travel between the three points.

The energy conversion device may be adapted to, in concert with control algorithms, to minimize the input energy into the active toroidal winding. The control algorithm may maintain the following relationship: $F_{tin} > F_p - F_{Mh}$ where $F_{tin}$ is the active toroidal winding force in a direction opposite that of the force of the piston 110 proportional to input voltage and current, $F_p$ is the piston force, and $F_{Mh}$ is the force of the horizontal magnet opposing the piston force $F_p$ such that a piston traveling along its longitudinal axis is decelerated as it approaches a horizontal magnet, stops instantaneously and then is accelerated by the toroidal winding 120, at a predetermined, empirically developed rate by the applied force $F_{tin}$, acting in concert with the repelling force of the end magnets.

Acting in concert with an end magnet the longitudinal axis of this device, including these magnets, can be oriented from 0-90 degrees relative to a horizontal plane, displaced a finite distance from the vertical mid-point whose primary force fields are oriented 90 degrees from the radial magnets, said magnets located such that their fields interact with the radial magnets along the vertical axis of the radial magnets, in those applications where a radial magnet is provided. This magnet or magnets can be positioned either internal to the stationary radial magnets (as illustrated) or external to the stationary radial magnets, i.e., the magnet has a larger inner diameter than the stationary radial magnet outer diameter using a ring type magnet configuration.

In the present disclosure, an exemplary rotational kinetic energy conversion system has been described having a linear kinetic energy conversion device with an oscillatable magnetic piston surrounded by a toroidal winding is provided in a fixed location (offset from the axis of rotation of a rotating wheel having a radially positioned actuating magnet such that, as the wheel is rotatably driven by a moving fluid, the magnet cyclically passes by the piston and causes the piston to oscillate, thereby inducing a current in the winding. The wheel may be, for example, a rotating wheel or rotating vanes driven by moving water or air. In another exemplary system, a pair of wheels is disposed on opposing sides of the linear kinetic energy conversion device, each provided with an actuating magnet or multiple magnets so as to provide a balance of magnetic forces on the piston as the wheels rotate. In still another exemplary system, a plurality of angularly spaced actuating magnets are provided on one or more wheels. In yet another exemplary system, a plurality of linear kinetic energy conversion devices are fixedly mounted in angularly spaced positions relative to one or more rotating wheels to provide a balanced power draw against the rotating wheel or wheels.

Importantly, the system can be efficiently operated at smaller scales than traditional wind turbines, thus making them an important energy option for homeowners and small businesses. Furthermore, the system is scalable for larger installations, for example, by making larger rotational and linear kinetic energy devices, by coupling multiple stages of kinetic devices to a single water or wind driven rotational device, or by putting multiple units, each with a kinetic energy conversion system, on a single post or shaft.

Figure 20:
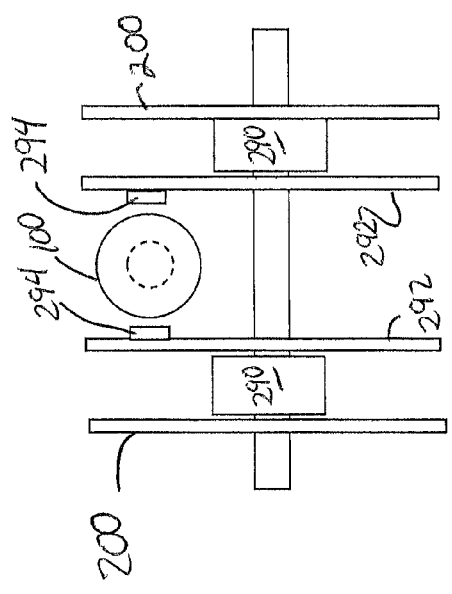
FIG. 20 is a schematic view of a rotational kinetic energy conversion system employing a gearing system to drive the linear kinetic energy conversion device at increased speeds.

It will be appreciated that each linear kinetic energy conversion device described above will have an optimum speed range inherent in its design. It is contemplated that a rotational kinetic energy system may be tunable to respond to different speeds of moving fluid. For example, the rotatable frame 200 rotatable directly by the moving fluid may be connected, through a system of gearing 290 such as a continuously variable speed transmission, as shown in FIG. 20, to a secondary frame or wheel 292 rotating at an optimum speed for the operation of the linear kinetic energy conversion device. The actuating magnets 294 may be mounted to the secondary wheel 292 so that the linear kinetic energy conversion device 100 experiences an oscillation at a desired rate. Alternatively, blades may be rotatable to present more or less effective surface area to the wind as wind speed changes. Similarly, the number and arrangement of linear kinetic energy conversion devices associated with a water wheel or windmill may be varied, for example, by providing a mechanism for moving the linear kinetic energy devices towards or away from the region of the actuating magnet. Alternatively, the axle or pole holding the units may be provided with a speed regulation system, such as a clutching or braking system to limit its rotational speed. Such clutching, blade turning, gearing and/or device moving systems may be automated and driven by a microprocessor and may be programmed to either optimize the efficiency of the system or to maximize power output, depending on the needs of the owner. The microprocessor may be operated by solar power when the wind is less than optimal.

Alternatively, the system may be designed to self-adjust to changing wind conditions. For example, the cups or paddles may be designed to flex in response to changing wind conditions to provide a non-linear response to increases in wind speed so as to reduce the effect of wind gusts or excessive wind. As an example, the cups may face downward 1 to 3 or 5 degrees or the propeller airfoils may be designed to create slight lift so that when they catch the wind and begin to spin, they will rise slightly, lessening the friction on the bottom but not creating enough lift so they fly away. The blades may alternatively be designed at varying angles, such that the bottom turbine is at ½ degree, the next 1 degree, above that 1.5 degrees or 2 degrees, etc. such that, as they spin, each blade separates from the blades above and below lessening the friction and lessening the wear while increasing the speed.

Features shown or described in association with one configuration may be added to or used alternatively in another configuration, including configurations described or illustrated in the provisional patent application and the patent cooperation treaty patent application referred to in the above cross-reference to related applications. The scope of the device should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future configurations. In sum, it should be understood that the device is capable of modification and variation and is limited only by the following claims.

All terms are intended to be given their broadest reasonable constructions and their ordinary meanings as understood by those skilled in the art unless an explicit indication to the contrary in made herein. In particular, use of the singular articles such as "a" and "the," should be read to recite one or more of the indicated elements unless a claim recites an explicit limitation to the contrary.

What is claimed as new and desired to be protected by Letters Patent of the United States is:

1. A rotational kinetic energy conversion system for converting between kinetic energy and electric energy, the rotational kinetic energy conversion system comprising:
   a magnetic piston displaceable along a first longitudinal axis:
   a winding disposed about the first longitudinal axis; and
   an actuating magnet displaceable in an orbital path about a second longitudinal axis to cyclically interact with the magnetic piston such that said actuating magnet periodically exerts a force on the magnet piston to oscillate the magnetic piston along the first longitudinal axis to induce an electrical current and voltage in the winding, thereby creating electrical energy.

2. The rotational kinetic energy conversion system of claim 1, further comprising a plurality of said actuating magnets, each cyclically imparting a magnetic force upon said piston to contribute to the oscillation of said magnetic piston.

3. The rotational kinetic energy conversion system of claim 2, wherein at least a pair of said actuating magnets orbit about said second longitudinal axis on opposing sides of the magnetic piston to exert a balanced force on the magnetic piston.

4. The rotational kinetic energy conversion system of claim 1, wherein the first and second longitudinal axes are perpendicular and non-intersecting.

5. The rotational kinetic energy conversion system of claim 1, further comprising a gear system coupled to a rotatable frame and a secondary frame attached to the gearing system, the actuating magnet being affixed to the secondary frame.

6. The rotational kinetic energy conversion system of claim 1, wherein the piston is located radially outward of the orbital path of the actuating magnet.

7. The rotational kinetic energy conversion system of claim 1, wherein the magnetic piston is located in an adjacent plane to the plane of the orbital path of the actuating magnet.

8. The rotational kinetic energy conversion system of claim 1, further comprising a plurality of said magnetic pistons, each disposed at a different angular position about the second longitudinal axis.

9. The rotational kinetic energy conversion system of claim 1, further comprising:
   a rotational kinetic energy conversion device comprising a rotatable frame driven by a moving fluid to rotate about the second longitudinal axis; the actuating magnet being affixed to the rotatable frame; and
   a linear kinetic energy conversion device comprising a fixed frame constraining the magnetic piston to oscillate along the first longitudinal axis, the magnetic piston being contained in the fixed frame.

10. The rotational kinetic energy conversion system of claim 9, wherein the rotatable frame comprises an axle disposed along the second longitudinal axis and a blade attached to the axle and extending radially therefrom, such that the rotatable frame may rotatably driven by the action of a moving fluid on the blade.

11. The rotational kinetic energy conversion system of claim 10, wherein the rotatable frame comprises a rotating wheel affixed with surfaces offering resistance to the moving fluid and imparting torque to turn the rotatable frame using surfaces selected from a blade, a cup, a vane, a propeller, an airfoil or any variation or combination of these surfaces.

12. The rotational kinetic energy conversion system of claim 10, wherein the rotatable frame comprises a plurality of fluid resisting surfaces.

13. The rotational kinetic energy conversion system of claim 10, wherein the actuating magnet is affixed to a fluid resisting surface.

14. The rotational kinetic energy conversion system of claim 10, wherein the rotatable frame further comprises at least one wheel attached to the axle, the fluid resisting surface extending from the wheel.

15. The rotational kinetic energy conversion system of claim 9, wherein the fixed frame comprises a housing enclosing the winding and the magnetic piston.

16. The rotational kinetic energy conversion system of claim 9, wherein the fixed frame comprises a pair of end magnets disposed along the first longitudinal axis adapted to exert a magnetic force on the magnetic piston to limit the displacement of the magnetic piston during oscillations and to accelerate the piston in the opposite direction.

17. The rotational kinetic energy conversion system of claim 9, wherein the magnetic piston comprises and axial magnetic component and a radial magnetic component.

18. A rotational kinetic energy conversion system for converting between kinetic energy and electric energy, the rotational kinetic energy conversion system comprising:
   a fixed frame having a housing, a magnetic piston contained in the rotatable frame and displaceable along a first longitudinal axis, and a winding disposed within the housing about the first longitudinal axis,
   a rotatable frame driven by a moving fluid to rotate about a second longitudinal axis perpendicular to and non-intersecting with the first longitudinal axis; the rotatable frame having a fluid resisting surface extending radially from the second longitudinal axis and engagable with a moving fluid to impart rotational kinetic energy to the rotatable frame, and an actuating magnet affixed at radial location such as to define an orbital path about a second longitudinal axis as the rotatable frame rotates, the actuating magnet positioned to cyclically interact with the magnetic piston such that said actuating magnet periodically exerts a force on the magnet piston to oscillate the magnetic piston along the first longitudinal axis to induce an electrical current in the winding.

19. The rotational kinetic energy conversion system of claim 18, further comprising a plurality of said actuating magnets, each cyclically imparting a magnetic force upon said piston to contribute to the oscillation of said magnetic piston.

20. The rotational kinetic energy conversion system of claim 18, further comprising a plurality of said rotatable frames, each disposed at a different angular position about the second longitudinal axis.

21. The rotational kinetic energy conversion system of claim 18, further comprising a pair of said rotatable frames, one disposed on each side of the fixed frame.

22. The rotational kinetic energy conversion system of claim 18, wherein the rotatable frame comprises a rotating wheel affixed with surfaces offering resistance to the moving fluid and imparting torque to turn the rotatable frame using surfaces selected from a blade, a cup, a vane, a propeller, an airfoil or any variation or combination of these surfaces.

23. The rotational kinetic energy conversion system of claim 18, wherein the fixed frame further comprises a pair of end magnets disposed along the first longitudinal axis adapted to exert a magnetic force on the magnetic piston to limit the displacement of the magnetic piston during oscillations and to accelerate the piston in the opposite direction.

\* \* \* \* \*